March 15, 1966 J. R. BRAY ETAL 3,240,916

SOLID STATE ANTICIPATING TEMPERATURE CONTROLLER

Filed Sept. 23, 1963

INVENTORS
JOHN R. BRAY
OTIS J. LOCKE
BY Kelly O. Corley
ATTORNEY

United States Patent Office 3,240,916
Patented Mar. 15, 1966

3,240,916
SOLID STATE ANTICIPATING TEMPERATURE CONTROLLER

John R. Bray and Otis J. Locke, Pensacola, Fla., assignors to Monsanto Company, a corporation of Delaware Filed Sept. 23, 1963, Ser. No. 310,806
3 Claims. (Cl. 219—501)

This invention relates to temperature control circuits, and more particularly to such control circuits using only solid state switching means and a particular feedback for decreasing the temperature error introduced by a change in thermal loading.

Temperature controllers according to the prior art are usually either of the on-off type or have some sort of feedback arrangement, such as U.S. Patent 3,042,781 by John R. Bray. In the feedback type of temperature controller, power is applied to the temperature sensing circuit at the same time that power is applied to the heater, to thereby modify the characteristics of the control circuit and reduce the amplitude of temperature fluctuations of the controlled element. According to the present invention these fluctuations are reduced still further by the circuit configuration and ranges of component values hereinafter described.

Accordingly, a primary object of the invention is to provide temperature controller circuits using a solid state switching element.

A further object is to provide control circuits of the above character wherein the temperature offset caused by differences in thermal loading is minimized.

A further object is to provide control circuits of the above character wherein such reduction in temperature offset is achieved by particular arrangement of the feedback circuit.

Other objects of the invention will in part be obvious and will in part appear hereinafter.

The invention accordingly comprises the features of construction, combination of elements, and arrangements of parts which will be exemplified in the construction hereinafter set forth, and the scope of the invention will be indicated in the claims.

Figure 1:
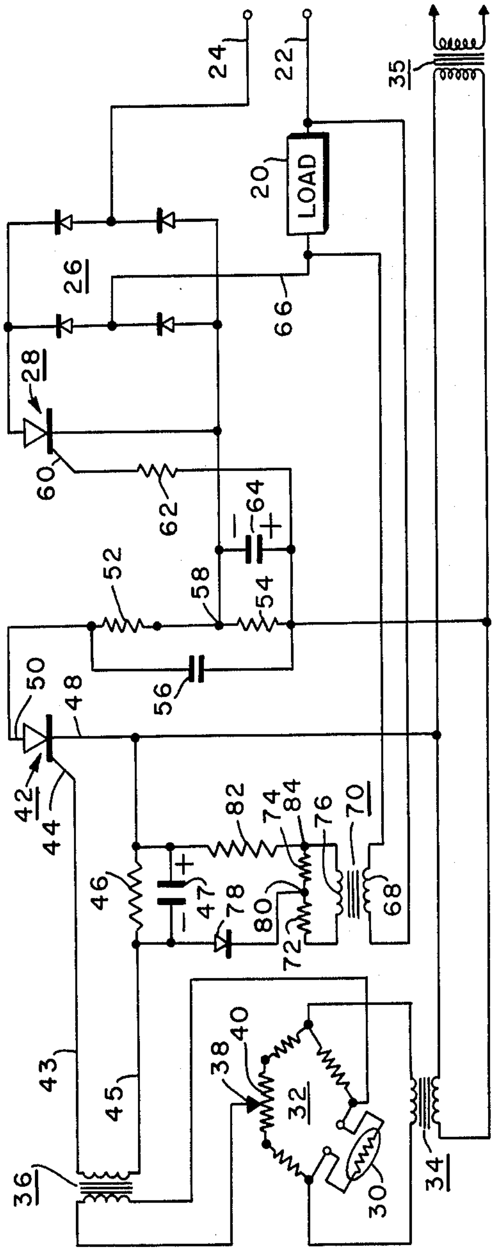
Figure 2:
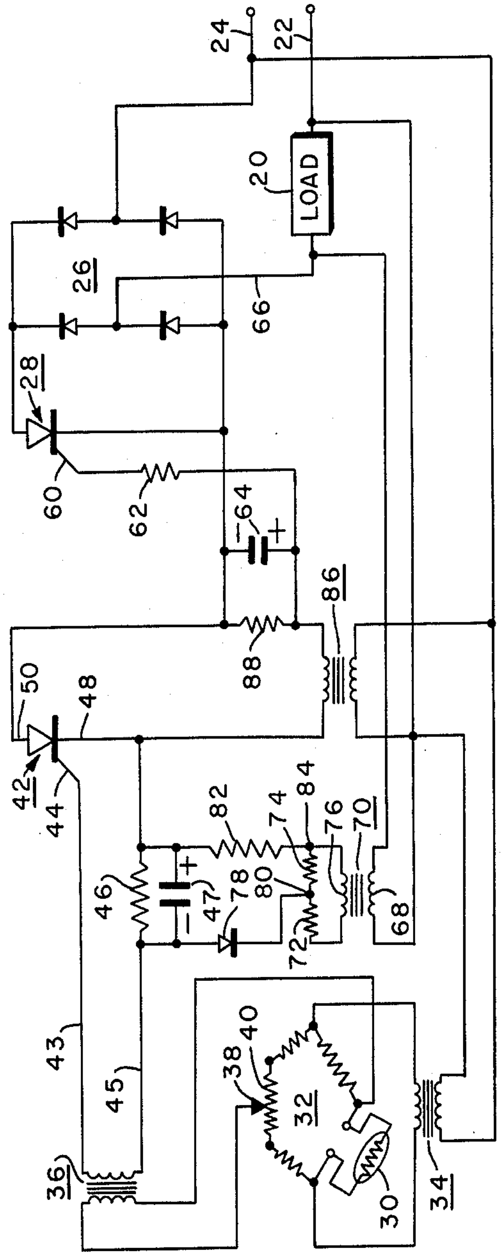

For a more complete understanding of the nature and objects of the invention, reference should be made to the following detailed description taken in connection with the accompanying drawing, in which:

FIGURE 1 is a schematic circuit diagram of a first embodiment of the invention; and FIGURE 2 is a schematic circuit diagram of a second embodiment of the invention.

Referring now to FIGURE 1, the circuit includes a heater load 20, the temperature of which is to be maintained at a predetermined point. Load 20 is supplied with alternating current from power supply conductors 22 and 24. Conductor 22, as illustrated, may be directly connected to one side of the load 20, while conductor 24 is connected through a diode bridge 26 to the opposite side of load 20 when silicon controlled rectifier 28 is conductive, as will be more fully explained.

The temperature of load 20 is sensed by a thermistor 30 placed in thermal contact with load 20 and connected in one leg of an A.C. Wheatstone bridge 32. A transformer 34 supplies power from the secondary winding of an isolation transformer 35 to one diagonal of bridge 32. The primary winding of transformer 35 may be connected to terminals 22 and 24 as desired, or to any other suitable A.C. power source. The remaining diagonal of bridge 32 is connected to the primary winding of a signal transformer 36, the secondary winding of which provides an error signal. The bridge output signal is preferably derived from a variable tap 38 on a potentiometer resistor 40 incorporated as part of bridge 32 so that the bridge output signal level may be set as desired for any given temperature of load 20. This permits manual selection of the desired operating temperature of load 20 by varying the position of tap 38.

The bridge error signal appearing at the secondary winding of transformer 36 is applied to control a second silicon controlled rectifier 42. As illustrated, one terminal 43 is connected to the gate electrode 44 while the remaining terminal 45 is connected through a resistor 46 and shunt capacitor 47 to the cathode 48 or rectifier 42. Cathode 48 is connected to one side of the secondary winding of transformer 35, while anode 50 is connected through series resistors 52 and 54 to the remaining side of the secondary winding of transformer 35. Transformer 36 should be connected so that the induced voltage at terminal 43 in phase with the potential appearing at anode 50.

It may be seen from the above description that application of an error signal to the gate and cathode electrodes of rectifier 42 will enable the rectifier to conduct alternate half cycles of the current supplied by transformer 35. The high frequency components of this load current in rectifier 42 are by-passed around resistors 52 and 54 by capacitor 56, so that a continuous D.C. signal voltage develops across resistor 54.

The cathode of rectifier 28 is connected to the junction 58 between resistors 52 and 54, while the gate electrode 60 of rectifier 28 is connected by a series resistor 62 to the opposite side of resistor 54. The portion of the output signal produced across resistor 54 is thus applied as an input signal of the proper polarity to control the conduction of rectifier 28, and accordingly controlling conduction through bridge 26. A filter capacitor 64 is shunted across resistor 54 to provide additional filtering or by-passing of high frequency components.

Still referring to FIGURE 1, terminals 24 and 66 are connected to the input diagonal of diode bridge 26, while the anode and cathode of rectifier 28 are connected across the control diagonal of bridge 26. The diodes and rectifier 28 are poled to permit conduction of current of either polarity through load 20 when rectifier 28 is conductive, and to block conduction when rectifier 28 is non-conductive.

A feedback network is provided for modifying the operation of the circuit so as to provide much closer control of the temperature of load 20. The primary winding 68 of a feedback transformer 70 is connected in parallel with load 20, so that transformer 70 is energized whenever power is applied to load 20. A voltage divider comprising resistors 72 and 74 is connected across the secondary winding 76 of feedback transformer 70. A diode 78 has its cathode connected to the junction 80 between resistors 72 and 74, and has its anode connected to terminal 45 of the secondary winding of transformer 35. A charging resistor 82 connects the junction 84 between resistor 74 and winding 76 to cathode 48 of rectifier 42 to complete the exemplary feedback circuit.

When power is applied to load 20, feedback transformer 70 is simultaneously energized to supply current to modify the operation of rectifier 42. The fraction of the voltage appearing across resistor 74 is rectified by diode 78 and applied to capacitor 47 as an exponentially increasing biasing signal having a polarity such as to oppose conduction in the gate-to-cathode circuit of rectifier 42. Thus, the error signal from bridge 32 appearing on terminals 43 and 45 can cause rectifier 42 to conduct only when it exceeds the biasing voltage appearing across capacitor 47 by an amount exceeding the firing potential of rectifier 42.

If the sensed temperature is far enough below the desired temperature as provided by the setting of tap 40, the error signal on terminals 43 and 45 will override the biasing voltage across fully charged capacitor 47 and will fire rectifier 42 each time that anode 50 is positive. This maintains rectifier 28 in a conductive state and applies full wave power to load 20.

As the temperature of load 20 increases, the bridge error signal decreases until at some temperature slightly below the desired temperature the sum of the error signal and the biasing voltage is insufficient to fire rectifier 42. Rectifier 28 then becomes non-conductive, de-energizing load 20 and feedback transformer 70. Capacitor 47 discharges through resistor 46, lowering the biasing voltage until the composite error signal and biasing voltage again is large enough to fire rectifier 42. Rectifier 28 is then actuated, applying power to load 20 and to the feedback network. The feedback current is rectified by diode 78 and charges capacitor 47 until the composite error signal and biasing voltage again decreases to less than the firing voltage of rectifier 42. This cyclic operation is continuously repeated as the temperature of load 20 approaches and remains at the desired temperature.

It has been found that much closer temperature regulation can be maintained if the time constants associated with the charging and discharging of capacitor 47 and with the low-pass filter connecting rectifiers 28 and 42 are properly selected. Optimum control and stability of operation are achieved if these time constants are so selected that, at the desired temperature, power is applied to the load for less than 1.5 seconds before the biasing voltage across capacitor 47 increases sufficiently to reduce the composite signal applied to gate 44 to below the firing voltage of rectifier 42. Similarly, the discharge rate of capacitor 47 preferably is such that rectifier 42 is then maintained non-conductive less than 2 seconds.

Exemplary component values suitable when the A.C. power supply connected to terminals 22 and 24 is 115 volts, and when the rectifier 42 is a General Electric Company type C5B, and when rectifier 28 is a General Electric Company type C10B, may include the following:

| | | |
|---|---|---|
| Resistor **46** | kilohms | 27 |
| Capacitor **47** | microfarads | 50 |
| Resistor **52** | kilohm | 1 |
| Resistor **54** | do | 1 |
| Capacitor **56** | microfarads | 5 |
| Resistor **62** | ohms | 100 |
| Capacitor **64** | microfarads | 50 |
| Resistor **72** | kilohms | 51 |
| Resistor **74** | do | 100 |
| Resistor **82** | do | 57 |

In this particular example, transformer 35 was an isolation transformer supplying 115 volts A.C. on its secondary winding. Transformer 34 stepped this voltage down to 6.5 volts, which was then supplied to bridge 32. Transformer 36 had a 1-kilohm primary winding and a 200-kilohm secondary winding, while transformer 70 had a 200-kilohm primary winding and 1-kilohm secondary winding. The diodes in bridge 26 were each type 1N3210. Selection of alternative component values to provide the operation described above may be readily made by those skilled in the art.

It should be noted that the FIGURE 1 circuit is adapted for application of a high A.C. voltage by transformer 35 to rectifier 42, since resistors 52 and 54 form a voltage divider for reducing the signal applied to the gate and cathode electrodes of rectifier 28 to the proper level.

A second embodiment of the invention is illustrated in FIGURE 2, wherein like elements are designated by the same reference characteristics as are used in FIGURE 1. The FIGURE 2 circuit differs from the FIGURE 1 circuit primarily in that it applies a low voltage to rectifier 42 rather than the full 115 volts as in FIGURE 1. Thus a stepdown transformer 86 has its primary winding connected across terminals 22 and 24, and its low voltage secondary winding connected to supply power to rectifier 42. Since a lower voltage is applied to the anode and cathode of rectifier 42, the voltage dividing network provided by resistors 52 and 54 in FIGURE 1 is replaced by a single load resistor 88 in the FIGURE 2 embodiment. As in FIGURE 1, the cathode of resistor 28 is connected to the negative side of the load resistor 88 while the gate electrode 60 is connected by resistor 62 to the positive side of load resistor 88. Since the isolation transformer 35 in FIGURE 1 has been eliminated in the FIGURE 2 embodiment the primary winding of transformer 34 is directly connected across power supply terminals 22 and 24. In all its operational major characteristics the FIGURE 2 embodiment substantially duplicates the performance provided by the FIGURE 1 embodiment, although it is somewhat simpler and contains fewer components.

It may be seen from the above disclosure and the accompanying drawings that there have been disclosed improved temperature controllers wherein the temperature offset caused by differences in thermal loading is minimized. Selection of appropriate component values for the feedback network and low-pass filter results in a temperature controller which provides substantially improved performance as compared to prior art controllers.

It will thus be seen that the objects set forth above, among those made apparent from the preceding description, are efficiently attained and, since certain changes may be made in the above circuits without departing from the scope of the invention, it is intended that all matter contained in the above description or shown in the acompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Apparatus for controlling a heater, comprising in combination:

(a) an electrical bridge having therein a thermistor thermally coupled to said heater for sensing the temperature thereof, said bridge producing a control signal having a magnitude varying with deviations of the sensed temperature from the predetermined value, (b) a first silicon controlled rectifier having first gate, first cathode and first anode electrodes, (c) an input circuit connected for applying said control signal to said first gate and said first cathode electrodes, said input circuit including a series capacitor, (d) A.C. power supply terminals, (e) switching means responsive to conduction of said first silicon controlled rectifier for connecting said heater across said power supply terminals, said switching means including (1) a second power silicon controlled rectifier having second gate, second cathode, and second anode electrodes, (2) and a rectifying diode bridge, said diode bridge having an input diagonal connected in series with said heater and said power supply, and a control diagonal connected to said second anode and said second cathode, (f) and a feedback network, energized by an application of power to said heater, for applying a charge to said capacitor opposing conduction of said first rectifier, said network including resistance means for controlling the charging and discharging time constants of said capacitor, 2. The temperature controller defined in claim 1, wherein said second gate and said second cathode electrodes are connected to said first anode and said first cathode electrodes by a low-pass filter.

3. The temperature controller defined in claim 2, wherein the components of said feedback network and of said low-pass filter are selected so that at the desired temperature power is applied to said heater for less than about 1.5 seconds per energization and so that the time between energizations is less than about 2 seconds.

References Cited by the Examiner

UNITED STATES PATENTS

| | | | |
|---|---|---|---|
| 3,042,781 | 7/1962 | Bray | 219—499 |
| 3,097,314 | 7/1963 | Harriman | 219—501 |
| 3,149,224 | 9/1964 | Home et al. | 219—501 |
| 3,159,737 | 12/1964 | Dora | 219—501 |

RICHARD M. WOOD, *Primary Examiner.*